United States Patent Office 3,801,648
Patented Apr. 2, 1974

3,801,648
SUBSTITUTED ALLYL PHENOLS
Edward D. Weil, Lewiston, and Hans L. Schlichting,
Grand Island, N.Y., assignors to Hooker Chemical Corporation, Niagara Falls, N.Y.
No Drawing. Application May 3, 1968, Ser. No. 736,894, now Patent No. 3,639,487, which is a division of application Ser. No. 260,076, Feb. 20, 1963, now Patent No. 3,385,899. Divided and this application May 10, 1971, Ser. No. 142,052
Int. Cl. C07c 149/32
U.S. Cl. 260—609 F        8 Claims

ABSTRACT OF THE DISCLOSURE
A compound of the formula

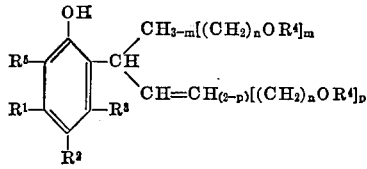

wherein:
(a) $R^1$, $R^2$, $R^3$ and $R^5$ are selected from the group consisting of hydrogen, chlorine, lower alkoxy, nitro, and lower alkyl;
(b) $R^4$ is selected from the group consisting of phenyl, nitrophenyl, chlorophenyl, and hydroxyphenyl; and
(c) $m$, $n$, and $p$ are integers from 0 to 1, the sum of $m$ and $p$ being 1.

---

This is a division of our copending application Ser. No. 736,894, filed May 3, 1968, now U.S. Pat. 3,639,487, which is a division of application Ser. No. 260,076, filed Feb. 20, 1963, now U.S. Pat. 3,385,899.

This invention relates to new phenolic compositions of matter and to processes for producing them. More specifically the present invention is concerned with novel sidechain substituted allyl phenols and to process for producing them.

The compositions of the present invention are useful as oxidation inhibitors, fungicides, antimicrobial agents and chemical intermediates.

The novel compositions of the present invention can be represented by the following general formula

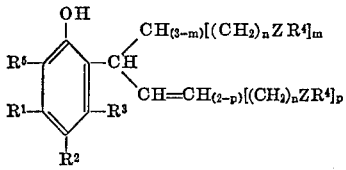

wherein the substituents $R^1$, $R^2$, $R^3$ and $R^5$ are each individually selected from the group consisting of hydrogen, halogen, alkyl from one to six carbon atoms, hydroxy, lower alkoxy, di(lower alkyl)amino, and nitro, with the total number of nitro groups being from zero to two, and where $R^4$ is a substituent selected from the group consisting of alkyl of from one to six carbon atoms, allyl, cyclohexyl, phenyl, chlorinated phenyl, nitrophenyl, hydroxyphenyl, benzyl, and lower acyl (one to six carbon atoms), Z is a substituent selected from the group consisting of oxygen, sulfur, —S(=O)—, and —SO$_2$—, Z being selected from oxygen and sulfur when $R^4$ is acyl, $m$ is an integer from zero to one, $p$ is an integer from zero to one, and the sum of $m$ and $p$ is 1, and $n$ is an integer from zero to one.

Illustrative examples of compounds of the present invention include, for instance; (a) o-alllylphenol having the following substituent on the alpha-position of the allyl group:

methoxymethyl
ethoxymethyl
isopropoxymethyl
butoxymethyl
amyloxymethyl
hexyloxymethyl
2-methoxyethyl
allyloxymethyl
cyclohexyloxymethyl
phenoxymethyl
benzyloxymethyl
p-chlorophenoxymethyl
2,4,5-trichlorophenoxymethyl
p-nitrophenoxymethyl
methylthiomethyl
ethylthiomethyl
phenylthiomethyl
p-chlorophenylthiomethyl
acetoxymethyl
butyroxymethyl
hexanoyloxymethyl
benzoyloxymethyl
acetylthiomethyl
methylsulfinylmethyl
methylsulfonylmethyl
p-chlorophenylsulfinylmethyl
p-chlorophenylsulfonylmethyl
2-methoxyethyl
2-butoxyethyl
2-cyclohexyloxyethyl
2-methylthioethyl
2-ethylthioethyl
2-phenylthioethyl
2-benzylthioethyl
2-p-chlorophenylthioethyl
2-acetylthioethyl
2-p-bromophenylthioethyl
trifluorocresoxymethyl.

(b) o-Methallylphenol having the above listed substituents on the gamma position of the methallyl group.
The following examples are listed to further illustrate the compositions included within the present invention.

2-(1-[methoxymethyl] allyl)-3-methylphenol
2-(1[methoxymethyl] allyl)-4-methylphenol
2-(1-[methoxymethyl] allyl)-5-methylphenol
2-(1-[methoxymethyl] allyl)-6-methylphenol
2-(1-[methoxymethyl] allyl)-3,4 (also 3,5; 3,6; 4,5; 4,6; and 5,6)-dimethylphenol
2-(1-[methoxymethyl] allyl-5-methoxyphenol
2-(1-[methoxymethyl] allyl)-4-(dimethylamino)phenol
2-(1-[methoxymethyl] allyl)-3,4,5-trimethylphenol
2-(1-[methoxymethyl] allyl)-3,5-diisopropylphenol
2-(1-[methoxymethyl] allyl)-3-sec-amylphenol
2-(1-[methoxymethyl] allyl)-4,6-di-tert-butylphenol
2-(1-[methoxymethyl] allyl)-3,4,6-trichlorophenol
2-(1-[methoxymethyl] allyl)-4,6-dichlorophenol
2-(1-[methoxymethyl] allyl)-4-nitrophenol
2-(1-[methoxymethyl] allyl)-4,6-dinitrophenol
2-(1-[2-methoxyethyl] allyl)-5-isopropylphenol
2-(1-[2,4,5-trichlorophenoxymethyl] allyl)-3,4,6-trichlorophenol
2-(1-[2,4-dichlorophenoxymethyl] allyl)-4,6-dichlorophenol
2-(1-[4-nitrophenoxymethyl] allyl)-4-nitrophenol 2-(1-[methoxymethyl] allyl)-3-hydroxyphenol
2-(1-[methoxymethyl] allyl)-4-hydroxyphenol
2-(1-[3-hydroxyphenoxymethyl] allyl)-3-hydroxyphenol
2-(1-[methoxymethyl] allyl)-4-bromophenol.

The synthesis of the compositions of the present invention is accomplished by heating and thus rearranging ethers of the type

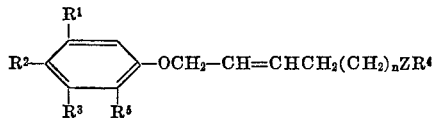

wherein $R^1$, $R^2$, $R^3$, $R^4$, $R^5$, Z and $n$ are as defined above.

The ethers required as starting materials (most of which are new compositions of matter) may be made by reacting the appropriate phenols of the formula

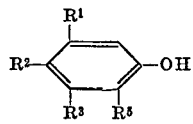

preferably in the presence of a base with an ether of the structure $XCH_2CH=CHCH_2)_nZR^4$ where X is a nucleophilically replaceable negative substituent such as halide, sulfonate, or sulfate, most commonly chloride or bromide for economic reasons. It is also possible to react the phenol with an isomeric ether of the structure $$CH_2=CH—CHX(CH_2)_nZR^4$$

in which case the phenoxy group becomes attached to the terminal carbon atom with simultaneous shift of the double bond into a position beta-gamma to the phenoxy group to yield the same product which is obtained by use of the $XCH_2CH=CHCH_2(CH_2)_nZR^4$ isomer.

An alternative route to the ethers required as starting materials for the process of the invention is, first, to react a 4-halo-2-butenyl aryl ether of the structure

with at east one molar equivalent of a nucleophile $MZR^4$, where M is a cation such as a metal (such as sodium) ammonium, or alkylammonium cation, preferably in an ionizing solvent (such as alcohol, water, dioxane, dimethylformamide, or the like), until the halogen is replaced by $ZR^4$. This method is useful where the value of $n$ in the product formula is zero.

The conversion of the ethers described above to the phenols is conducted by heating the ether to a temperature in the range of about 125 to 275 degrees centigrade, preferably 140-260 degrees centigrade, by itself or in the presence of an inert solvent such as N,N-diethylaniline, until a substantial conversion of the ether to a phenol occurs, generally requiring from about 5 minutes to about 1 week, depending on temperature. The reaction proceeds with rearrangement of the allyl radical onto the ring position ortho to the phenolic oxygen. A small amount of para substitution may accompany this principal reaction, and the products of the invention may contain minor amounts of isomeric impurities from this cause, such impurities being either separated or tolerated as harmless. The principal course of the rearrangement appears to be

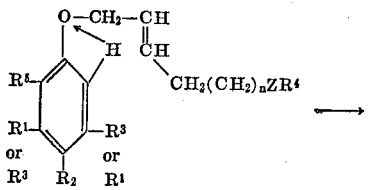

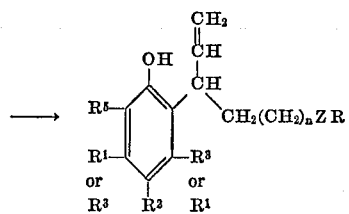

A further rearrangement may proceed concurrently and subsequently, to a greater degree as the temperature is raised or the time lengthened, to a lesser degree as the temperature is held near the lower end of the indicated range or as the reaction time is held to a minimum. This further rearrangement proceeds as follows

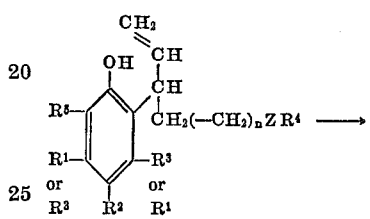

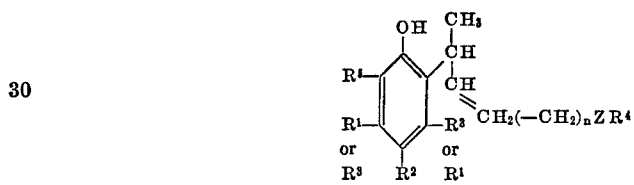

Consequently the product may be a mixture of both side chain isomers, which differ only in the values of $m$ and $p$ in the general formula. The isomer where $m$ is 1 and $p$ is 0 generally predominates.

The process may be operated conveniently at or near atmospheric pressure, although lower and higher pressures may be utilized without departing from the scope of the invention. Where one or two of the groups $R^2$ and $R^5$ are to be nitro, it may be preferred to insert one or both nitro groups by subsequent nitration of the compound of the invention having hydrogen at the site where nitro is desired.

The rearrangement reaction of the ethers described above can also be conducted with essentially sole formation of the phenolic products of the invention where $m$ is 1 and $p$ is 0 by subjecting the said ethers to a Lewis acid catalyst, such as boron halides, especially boron trichloride at about −30 to 100° C.

The novel phenols of the invention have a pronounced degree of biological activity, being fungicidal, bacteriostatic, and bacteriocidal. They also, especially where $R^1$, $R^2$, $R^3$, and $R^5$ are hydrogen or alkyl, have a high degree of antioxidant and stabilizing activity and thus may be incorporated into petroleum oils and fuels, resins, elastomers, fats, greases, films, moldings, laminates, paints and other coatings and solvents to inhibit or prevent deterioration caused by air oxidation and thermal or photochemical deterioration of the substrate.

A preferred subgroup of the compounds of the invention is the group wherein $R^5$ is hydrogen, $R^1$, $R^2$, and $R^3$ are chosen from hydrogen and lower alkyl, $R^4$ is lower alkyl, and Z, $n$, and $p$ are as originally defined. This group is especially of interest as precursors of insecticidally active N-methylcarbamates described in a copending application filed on even date herewith.

A second preferred subgroup of the compounds of the invention is the group wherein $R^4$ is a phenyl group bearing the same substituents (i.e. $R^1$, $R^2$, $R^3$, $R^5$ as are present on the phenolic phenyl ring, where $n=0$ and where Z is oxygen). These phenols are prepared especially readily by the process of the invention wherein the ether intermediate is symmetrical, thusly:

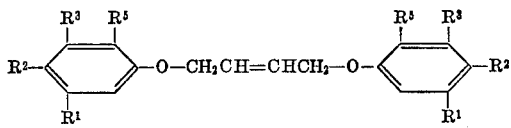

These ether intermediates are prepared at very low cost in one step from the commercially available dichlorobutene (principally 1,4) by reaction with two molar equivalents of the appropriately substituted phenol in the presence of base.

In addition to the carbamates, other esters of the phenols of the invention have insecticidal utility. For instance, the O,O-di(lower alkyl)phosphorothioates such as O,O-dimethyl O-2-(1-[methoxymethyl] allyl-4-nitro phenyl phosphorothioate have systemic insecticidal properties not possessed by parathion.

In order that those skilled in the art may better understand the present invention and the manner in which it may be praticed the following specific examples are given.

EXAMPLE 1

A solution of 40 grams of trans-1,4-diphenoxy-2-butene and 200 cubic centimeters of N,N-diethylaniline was refluxed for 7 hours then stripped under 0.4 millimeter pressure to remove diethylaniline. The residual oil was washed with dilute hydrochloric acid several times, then extracted with 200 cubic centimeters of 10 percent NaOH. The caustic solution was acidified, depositing an oil which was extracted with benzene, the benzene washed with water and dried over magnesium sulfate. The solution was then filtered and evaporated, leaving 30 grams of product as an oil.

Analysis.—Calculated for $C_{16}H_{16}O_2$: neutralization equivalent 240. Found (potentiometric titration with tetrabutylammonium hydroxide in pyridine): 250

The infrared spectrum of the product showed bands of about equal strength at wave lengths charactertistic of terminal and nonterminal C=C groups; also both CH— and =CH$_2$ bands were in evidence. The product consequently is a mixture of I and II.

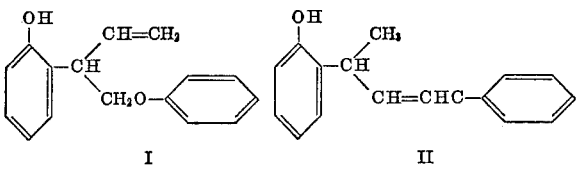

By conducting the reaction at 165 degrees centigrade, a phenolic product predominantly having the band characteristic of —CH=CH$_2$ groups is obtained.

EXAMPLE 2

Five grams of the product of Example 1, 1.5 grams of methyl isocyanate, 20 cubic centimeters of benzene, and 1 drop of dibutyltin laurate were mixed and let stand for one hour. The mixture was then evaporated leaving the carbamate as an oil. Potentiometric titration indicated the phenolic group to be absent.

Analysis.—Calculated for $C_{18}H_{19}O_3N$ (percent): N, 472. Found (percent): N, 4.79.

On prolonged standing, the oil partly crystallized. The crystals were removed and recrystallized from benzene-heptane to obtain a colorless solid, melting point 66 to 67 degrees centigrade. Infrared analysis showed essentially none of the —CH=CH$_2$ band at 915 cm.$^{-1}$, consequently this crystalline product was substantially the pure isomer having the —CH(CH$_3$)CH=CHOC$_6$H$_5$ side chain.

EXAMPLE 3

To a solution of 10 grams of sodium methoxide in 100 cubic centimeters of methanol was added 18.3 grams of trans-1-chloro-4-phenoxy-2-butene, then the mixture was refluxed for several hours, stripped free of methanol under reduced pressure and the residue added to water. The organic oil was extracted with ether, dried over soda ash, and then stripped free of ether under reduced pressure leaving 15.5 grams of 1-methoxy-4-phenoxy-2-butene as a colorless oil.

A solution of 14 grams of 1-methoxy - 4-phenoxy-2-butene in 50 cubic centimeters of diethylaniline was refluxed for 13 hours, then the product isolated as in Example 1 to obtain 8.5 grams of colorless phenolic oil. The infrared spectrum indicated it to be predominantly the o-substituted phenol having the

side chain.

EXAMPLE 4

Five grams of the product of Example 3, 2 grams methyl isocyanate, 1 drop dibutyltin laurate, and 50 cubic centimeters benzene were refluxed for one hour, then stripped to 100 degrees centigrade under aspirator vacuum, leaving the product as a colorless oil.

Analysis.—Calculated for $C_{13}H_{17}O_3N$ (percent): N, 5.96. Found (percent): N, 5.7.

EXAMPLE 5

To a solution of 6 grams of sodium methoxide and 7 grams of ethyl mercaptan in 100 cubic centimeters of methanol was added 18.3 grams of 1-chloro-4-phenoxy-2-butene. After standing overnight, the solution was added to water, the oil extracted with ether, dried over magnesium sulfate, and evaporated free of ether leaving 1-ethylthio-4-phenoxy-2-butene as a colorless oil, boiling point 90 to 93 degrees centigrade (0.08 millimeter).

Analysis.—Calculated for $C_{12}H_{16}OS$ (percent): S, 15.4. Found (percent): S, 15.0.

EXAMPLE 6

A solution of 14 grams of the product of Example 5 in 50 cubic centimeters of diethylaniline was refluxed for 10 hours, then worked up as in Example 1 to obtain 12 grams of phenolic oil, having the correct neutralization equivalent for $C_{12}H_{16}OS$.

EXAMPLE 7

The product of Example 6 (4 grams) was allowed to stand in 25 cubic centimeters of benzene with 1.5 grams of methyl isocyanate for 4 days, then the mixture was stripped to 100 degrees centigrade at 0.01 millimeter pressure leaving a brownish oil. A potentiometric titration demonstrated the absence of the phenolic group. The infrared spectrum indicated the carbamate carbonyl group (band at 5.7 microns).

EXAMPLE 8

To a solution of 6 grams of sodium methoxide and 12.5 grams of thiophenol in 100 cubic centimeters of methanol was added 18.3 grams of 1 - phenoxy - 4-chloro-2-butene. After standing overnight, the reaction mixture was poured into water. The product came out as colorless crystals which were washed with water, then recrystallized from aqueous ethanol to obtain 18.5 grams colorless platelets, melting point 50 to 51.5 degrees centigrade.

Analysis.—Calculated for $C_{16}H_{16}OS$ (percent): S, 12.5. Found (percent): S, 12.0.

EXAMPLE 9

A solution of 14 grams of the product of Example 8 in 50 cubic centimeters of N,N-diethylaniline was refluxed under nitrogen for 10 hours, then worked up as in Example 1 to obtain a phenolic oil having the correct neutralization equivalent for $C_{16}H_{16}OS$.

EXAMPLE 10

The reaction of the product of Example 9 with methyl isocyanate was conducted as in Example 7 to obtain the desired carbamate as a brownish oil.

*Analysis.*—Calculated for $C_{18}H_{19}O_2SN$ (percent): N, 4.48. Found (percent): N, 4.1.

EXAMPLES 11–16

Following the procedure of Example 3, 0.1 mole portions of trans-1-chloro-4-phenoxy-2-butene was reacted with substantially equimolar amounts of various sodium alkoxides in excess of the alcohols, corresponding to the alkoxides. In each case, after at least 40 hours at room temperature (except for initial spontaneous exotherm) the reaction mixtures were stripped free of the alcohol, the residues washed with water, and the organic oil distilled. The yields and properties of the products are as follows:

| Number | Ether | Yield (g) | Properties |
|---|---|---|---|
| 11E | 1-ethoxy-4-phenoxy-2-butene. | 15 | Oil, B.P.86–90° (0.05 mm.). |
| 12E | 1-isopropoxy-4-phenoxy-2-butene. | 13 | Oil, B.P.84–90° (0.15 mm.). |
| 13E | 1-n-butoxy-4-phenoxy-2-butene. | 15 | Oil, B.P.107–110° (0.25 mm.). |
| 14E | 1-pri-amyloxy-4-phenoxy-2-butene. | 17.5 | Oil, B.P.110–114° (0.1 mm.). |
| 15E | 1-cyclohexyloxy-4-phenoxy-2-butene. | 11 | Oil, B.P.120.5–123° (0.15 mm.). |
| 16E | 1-(2-methoxyethoxy)-4-phenoxy-2-butene. | 15 | Oil, B.P.107–111° (0.1 mm.). |

Each of these products was rearranged to the corresponding alkoxybutenyl phenol by heating without solvent under nitrogen in a vessel immersed in a vapor bath at 230 to 240 degrees centigrade.

| No. | Phenol | Derived from— | Physical form |
|---|---|---|---|
| 11P | OH, $C_4H_6OC_2H_5$ | 11E | Brownish oil. |
| 12P | OH, $C_4H_6OCH(CH_3)_2$ | 12E | Do. |
| 13P | OH, $C_4H_6OCH_2CH_2CH_2CH_3$ | 13E | Light yellowish oil. |
| 14P | OH, $C_4H_6OC_5H_{11}$-pri | 14E | Do. |
| 15P | OH, $C_4H_6O$-cyclo-$C_6H_{11}$ | 15E | Do. |
| 16P | OH, $C_4H_6$-$OCH_2CH_2OCH_3$ | 16E | Do. |

All the above phenols showed substantially the correct neutralization equivalent when potentiometrically titrated with 0.1 N tetrabutylammonium hydroxide in pyridine solution. The infrared spectra of these products exhibited a band at 915 cm.$^{-1}$ indicating the

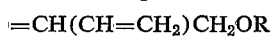

structure and at 975 cm.$^{-1}$ indicating the

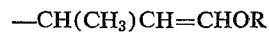

structure, predominantly the former.

Each of the above phenols (1 part by weight) was allowed to stand for one day with 0.5 part by weight of methyl isocyanate plus a catalytic amount (1%) of dibutyltin dilaurate, then stripped to about 120 degrees centigrade under 0.1 millimeter pressure to remove excess isocyanate. The products remained as undistilled syrups.

| Number | Carbamate* | Derived from— | Physical form | Percent N Calcd. | Percent N Found |
|---|---|---|---|---|---|
| 11C | OCONHCH$_3$, $C_4H_6OC_2H_5$ | 11P | Light brown syrup | 5.6 | 5.1 |
| 12C | OCONHCH$_3$, $C_4H_6OCH(CH_3)_2$ | 12P | do | 5.3 | 5.7 |
| 13C | OCONHCH$_3$, $C_4H_6OCH_2CH_2CH_2CH_3$ | 13P | Straw-colored syrup | 5.1 | 5.0 |
| 14C | OCONHCH$_3$, $C_4H_6OC_5H_{11}$-pri | 14P | do | 4.8 | 4.8 |
| 15C | OCONHCH$_3$, $C_4H_6O$-cyclo-$C_6H_{11}$ | 15P | Reddish-brown syrup | 4.6 | 4.5 |
| 16C | OCONHCH$_3$, $C_4H_6OCH_2CH_2OCH_3$ | 16P | Light brown syrup | 5.0 | 5.1 |

*—$C_4H_6$— in these formulae refers to the mixture of isomeric side chains —CH(CH=CH$_2$)CH$_2$— and —CH(CH$_3$)CH=CH—, predominating in the former.

EXAMPLE 17

To a solution of 15 grams of sodium methoxide and 22 grams methyl mercaptan in 250 cubic centimeters methanol was added 18.3 grams of 1-chloro-4-phenoxy-2-butene, causing a vigorous exotherm. When the reaction subsided, the mixture was refluxed for one hour, then stripped under vacuum to remove alcohol. The product was taken up in benzene, washed with water, stripped free of benzene, and distilled to obtain 16 grams of 1-methyl-thio-4-phenoxy-2-butene as a nearly colorless oil, boiling point 104 to 105 degrees centigrade (0.15 mm.).

*Analysis.*—Calculated for $C_{11}H_{14}OS$ (percent): S, 16.5. Found (percent): S, 16.2.

This sulfide was rearranged to the corresponding phenol by heating under nitrogen at 235 degrees centigrade then cooled to 25 degrees centigrade and treated with methyl isocyanate (50% molar excess) for one hour under reflux. The desired N-methylcarbamate was obtained as a brownish syrup having the correct sulfur and nitrogen analysis for $C_{13}H_{17}O_2NS$.

EXAMPLE 18

To a solution of 47 grams of phenol and 20 grams of sodium hydroxide in 200 cubic centimeters of ethanol was added 21 grams of a mixture of roughly equal amounts of $CH_3OCH_2CH_2CH=CHCH_2Cl$ and $$CH_3OCH_2CH_2CH_2Cl-CH=CH_2$$

(obtained by the known addition of chloromethyl methyl ether to butadiene in the presence of zinc chloride). The solution was refluxed for 90 minutes, then evaporated to a pot temperature of 100 degrees centigrade, water then added to dissolve the salts, and the organic oil separated off. The oil was distilled at 100 to 120 degrees centigrade (1.5 mm.). Infrared examination showed it was principally $CH_3OCH_2CH_2CH=CHCH_2OC_6H_5$ with a very minor amount of $$CH_3OCH_2CH_2CH(OC_6H_5)-CH=CH_2$$

This ether was converted to the corresponding phenol by heating at 234 to 240 degrees centigrade for 1 hour. The product was a light amber oil, neutralization equivalent 205 (theory 192, therefore 94% pure). The phenol was found by infrared examination to have both the $$-CH(CH=CH_2)CH_2CH_2OCH_3$$

and $-CH(CH_3)CH=CHCH_2OCH_3$ side chain isomers present, but predominantly the former. The phenol was converted to the corresponding N-methylcarbamate by warming at 40 degrees centigrade for 1 hour with ⅓ its volume of methyl isocyanate in the presence of 1 to 2 percent triethylene diamine catalyst. It was then freed of excess isocyanate by warming to 120 degrees centigrade at 0.1 millimeter, leaving the carbamate as a light tan syrup having the correct nitrogen analysis and showing the carbamate carbonyl and N—H bands in the infrared spectrum.

EXAMPLE 19

1,4-bis(p-cresoxy)-2-butene (I) was obtained by refluxing 11 grams sodium methoxide in 100 milliliters methanol with 21 grams p-cresol and then adding 13 grams trans-1,4-dichloro-2-butene; yield 90 percent of colorless crystalline solid, melting point 118 degrees centigrade.

A solution of 8 grams of this intermediate in 8 grams N,N-diethylaniline was refluxed for four hours, then stripped under 0.5 millimeter pressure to remove diethylaniline. The residue was washed with dilute hydrochloric acid several times, then recrystallized from ethanol yield 7 grams of the corresponding cresoxybutenylcresol (IV), a colorless solid, melting point 105 degrees centigrade.

Treating a solution of 5 grams of this phenol in 10 milliliters benzene with methyl isocyanate as described in Example 2 yields the corresponding p-cresoxy butenylcresyl N-methylcarbamate, 5 grams of colorless solid, melting point 102.5 to 103 degrees centigrade (from heptane).

*Analysis.*—Calculated for $C_{20}H_{23}O_3N$ (percent): N, 4.31. Found (percent): N, 4.46.

EXAMPLE 20

To a solution of 11 grams sodium methoxide in 100 milliliters ethanol was added 21 grams p-cresol and then 25 grams trans-1,4-dichloro-2-butene. After refluxing for two hours, the reaction mixture is poured into ether. A distillation yields 15 grams trans-1-chloro-4-p-cresoxy-2-butene, a colorless liquid, boiling point 100 to 105 degrees centigrade (0.3 mm.), $n_D^{25}$ 1.5378. As by-product there is formed 5 grams of 1,4-bis(p-cresoxy)-2-butene identical with that described in the preceding example.

Trans-1-chloro-4-p-cresoxy-2-butene is converted into 1-methoxy-4-p-cresoxy-2-butene, by reacting with sodium methoxide similarly as described in Example 3, to obtain a colorless liquid, boiling point 95 to 100 degrees centigrade (0.05 mm.), $n_D^{25}$ 1.5166. Heating 20 grams of this ether up to 230 degrees centigrade for three hours yields on distillation 12 grams of the corresponding methoxybutenyl-p-cresol, a colorless liquid, boiling point 150 to 155 degrees centigrade (0.05 mm.), $n_D^{25}$ 1.5640.

Treatment of this cresol in benzene solution gives methoxybutenyl-p-cresyl N-methylcarbamate as an oil. Potentiometric titration indicated the phenolic group to be absent.

*Analysis.*—Calculated for $C_{14}H_{19}O_3N$ (percent): N, 5.62. Found (percent): N, 5.60.

EXAMPLE 21

To a solution of 11 grams sodium methoxide in 100 milliliters methanol was added 26 grams trans-1,4-dichloro-2-butene, then the mixture was refluxed for 1 hour, poured into 500 milliliters water, and extracted with ether. The organic layer was dried over calcium chloride and then distilled to yield 16 grams 1-chloro-4-methoxy-2-butene, boiling point 70 to 72 degrees centigrade (13 mm.), $D_{25}^{25}$ 1.004, $n_D^{25}$ 1.4484.

*Analysis.*—Calculated for $C_5H_9OCl$ (percent): Cl, 29.46. Found (percent): Cl, 29.5.

Refluxing 1-chloro-4-methoxy-2-butene with an equimolar amount of the sodium salts of the corresponding phenols in benzene/ethanol yields the following methoxybutenyl aryl ethers as summarized in the following table.

| Number | Structure | Yield (percent) | B.P. (° C.)/mm. | $n_D^{25}$ |
|---|---|---|---|---|
| 1 | <br>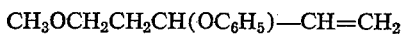 | 85 | 100/0.05 | 1.5166 |
| 2 | 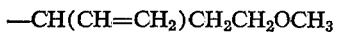 | 73 | { 160/12<br>85/0.05 } | 1.5181 |

TABLE—Continued

| Number | Structure | Yield (percent) | B.P. (° C.)/mm. | $n_D^{25}$ |
|---|---|---|---|---|
| 3 | OCH₂CH=CHCH₂OCH₃ on phenyl with –CH(CH₃)₂ | 78 | 120/0.03 | 1.5109 |
| 4 | OCH₂CH=CHCH₂OCH₃ on phenyl with Cl | 83 | 100–110/0.05 | 1.5280 |
| 5 | OCH₂CH=CHCH₂OCH₃ on phenyl with Cl | 83 | 108–112/0.1 | 1.5326 |
| 6 | OCH₂CH=CHCH₂OCH₃ on phenyl with (CH₃)₂CH– and –CH(CH₃)₂ | 70 | 140–150/0.03 | 1.5070 |

EXAMPLE 22

The methoxybutenyl aryl ethers as described in the preceding example are heated up to 230 to 235 degrees centigrade for three hours, and then stripped free of ether under reduced pressure, leaving the rearranged phenol derivative behind. These phenols are converted into N-methylcarbamates by treatment with methyl isocyanate as described in Example 2.

TABLE

| Number | Structure* R=OCONHCH₃ | Physical appearance | N analysis Calcd. | N analysis Found |
|---|---|---|---|---|
| 1 | R on phenyl with CH(CH=CH₂)(CH₂OCH₃) and CH₃ | Oil | 5.62 | 5.60 |
| 2 | R on phenyl with CH(CH=CH₂)(CH₂OCH₃) and H₃C– | Oil | 5.62 | 5.59 |
| 3 | R on phenyl with CH(CH=CH₂)(CH₂OCH₃) and (CH₃)₂CH– | Oil | 5.05 | 4.95 |
| 4 | R on phenyl with CH(CH=CH₂)(CH₂OCH₃) and Cl | Wax | 5.20 | 5.19 |
| 5 | R on phenyl with CH(CH=CH₂)(CH₂OCH₃) and Cl– | Oil | 5.20 | 5.17 |
| 6 | R on phenyl with CH(CH=CH₂)(CH₂OCH₃), (CH₃)₂CH– and –CH(CH₃)₂ | Oil | 4.39 | 4.31 |

*Principal isomer, accompanied by minor amount of γ-methoxymethallyl isomer.

EXAMPLE 23

Employing analogously p-chlorophenol instead p-cresol as described in Example 19, 1,4-bis(p-chlorophenoxy)-2-butene is obtained. Yield 95 percent, melting point 123 degrees centigrade.

*Analysis.*—Calculated for $C_{16}H_{14}O_2Cl_2$ (percent): Cl, 22.8. Found (percent): Cl, 22.4.

Heating of this diether up to 230 to 240 degrees centigrade for four hours, yields a phenol, which may be purified by dissolving in 2 N NaOH solution and extracting the unreacted neutral portions with ether. Addition of dilute sulfuric acid to the aqueous layer gives 2-(p-chlorophenoxybutenyl)-p-chlorophenol, which may be isolated by ether extraction. Treating this phenol in trichloroethylene with methyl isocyanate gives the desired 2-(p-chlorophenoxybutenyl)-p-chlorophenyl N-methylcarbamate.

*Analysis.*—Calculated for $C_{18}H_{17}O_3Cl_2N$ (percent): N, 3.85; Cl, 19.4. Found (percent): N, 3.78; Cl, 19.2.

EXAMPLE 24

Fungicidal activity

Bean plants (Tendergreen variety) were sprayed with an aqueous dispersion of 2 - (1-[methoxymethyl]allyl)-4-methylphenol at 0.04 percent concentration and then infested heavy with spores of bean mildew. Some unsprayed plants were also infested at the same time. About one week later, when the latter plants were heavily midewed, the sprayed plants were 100 percent free of the disease symptoms.

EXAMPLE 25

Bacteriostatic activity

*Staphylococcus aureus* spores inoculated onto nutrient agar containing 0.01 percent of the following phenols are found not to propagate to a measurable degree:

2-(1-[4-chlorophenoxy]allyl)-4-chlorophenol
2-(1-[2,4-dichlorophenoxy]allyl)-4,6-dichlorophenol
2-(1-[2,4,5-trichlorophenoxy]allyl)-3,4,6-trichlorophenol
2-(1-[4-nitrophenoxy]allyl)-4-nitrophenol
2-(1-[methoxymethyl]allyl)-4-chlorophenol
2-(1-[methoxymethyl]allyl)-5-hexyloxyphenol.

EXAMPLE 26

Fungicidal activity

Cotton seeds are treated with 6 ounces of the following compounds per 100 pounds (the chemicals are formulated as 50 percent wettable powders by brinding with 45 percent clay, 3 percent ligninsulfonate dispersing agent, and 2 percent naphthalenesulfonate wetting agent):

2-(1-[4-chlorophenoxy]allyl)-4-chlorophenol
2-(1-[2,4-dichlorophenoxy]allyl)-4,6-dichlorophenol
2-(1-[2,4,5-trichlorophenoxy]allyl)-3,4,6-trichlorophenol
2-(1-[4-nitrophenoxy]allyl)-4-nitrophenol
2-(1-[methoxymethyl]allyl)-4-chlorophenol
2-(1-[methoxymethyl]allyl)-5-hexyloxyphenol.

The treated seeds are then planted in soil heavily infested with Rhizoctonia and Fusarium fungi. Untreated seeds also planted in the same soil largely fail to yield viable seedlings because of damping-off, whereas the treated seeds yield a healthy stand of cotton seedlings.

The phenols of the invention also have utility as stabilizing additives, as shown by the following example.

EXAMPLE 27

Antioxidant activity

A sample of polyethylene is milled with 0.05 percent by weight of 2-(1-[methoxymethyl]allyl) - 6 - tert-butyl-phenol. The milled sample is then placed in a vessel at 150 degrees centigrade in an atmosphere of oxygen and the volume of oxygen absorbed is followed manometrically. The sample containing the additive is found to exhibit a lengthy induction period before any substantial oxygen uptake occurs whereas the polyethylene without the additive begins to take up oxygen at a rapid rate almost immediately.

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A compound of the formula

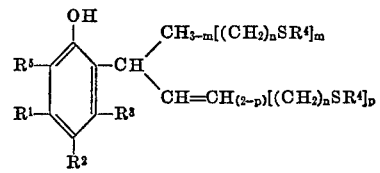

wherein:

(a) $R^1$, $R^2$, $R^3$ and $R^5$ are selected from the group consisting of hydrogen, chlorine, lower alkoxy, nitro, and lower alkyl;
(b) $R^4$ is selected from the group consisting of allyl, phenyl, nitrophenyl, chlorophenyl, hydroxyphenyl and lower alkyl;
(c) $m$, $n$, and $p$ are integers from 0 to 1, the sum of $m$ and $p$ being 1.

2. The compound of claim 1 wherein:
(a) $m$ is 1;
(b) $R^1$, $R^2$, $R^3$ and $R^5$ are selected from the group consisting of hydrogen, chlorine and nitro.

3. The compound of claim 2 wherein:
(a) $R^1$ and $R^3$ are hydrogen;
(b) $R^2$ and $R^5$ are chlorine;
(c) $R^4$ is 2,4-dichlorophenyl; and
(d) $n$ is 0.

4. The compound of claim 2 wherein $R^4$ is selected from the group consisting of phenyl, chlorophenyl, nitrophenyl, and hydroxyphenyl.

5. The compound of claim 2 wherein $R^4$ is lower alkyl.

6. The compound of claim 5 wherein
(a) $n$ is 0; and
(b) $R^1$, $R^2$, $R^3$, and $R^5$ are selected from the group consisting of hydrogen and lower alkyl, up to three of said R's being lower alkyl.

7. The compound of claim 6 wherein said lower alkyl is methyl.

8. The compound of claim 7 wherein $R^1$, $R^2$, $R^3$ and $R^5$ are hydrogen.

References Cited

UNITED STATES PATENTS 3,349,116   10/1967   Weil et al.  _____ 260—609 F

LEWIS GOTTS, Primary Examiner

D. R. PHILLIPS, Assistant Examiner

U.S. Cl. X.R.

260—476 R, 488 R, 574, 607 R, 611 R, 613 R

UNITED STATES PATENT OFFICE
CERTIFICATE OF CORRECTION

Patent No. 3,801,648           Dated     April 2, 1974

Inventor(s)     Edward D. Weil and Hans L. Schlichting

It is certified that error appears in the above-identified patent and that said Letters Patent are hereby corrected as shown below:

Column 3, line 24, "$CHCH_2)_nZR^4$" should read --$CHCH_2(CH_2)_nZR^4$--.
Column 4, first formula "$CH_2(CH_2)_nZR$" should read --$CH_2(CH_2)_nZR^4$--.
Column 5, line 42, "$CH-$" should read --$CH_3-$--; line 46, 2nd formula "CHC" should read --CHO--; line 63, "472" should read --4.72--. Column 10, line 8, "ethanol yield" should read --ethanol to yield--. Column 13, line 27, "midewed" should read --mildewed--; line 49, "brinding" should read --grinding--.

Signed and sealed this 30th day of July 1974.

(SEAL)
Attest:

McCOY M. GIBSON, JR.           C. MARSHALL DANN
Attesting Officer              Commissioner of Patents